(12) United States Patent
Hepworth et al.

(10) Patent No.: US 9,980,108 B2
(45) Date of Patent: May 22, 2018

(54) EMERGENCY ALERT

(75) Inventors: Eleanor Hepworth, Romsey (GB); Stephen McCann, Southampton (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1680 days.

(21) Appl. No.: 12/312,491

(22) PCT Filed: Nov. 12, 2007

(86) PCT No.: PCT/GB2007/050683
§ 371 (c)(1),
(2), (4) Date: Dec. 28, 2009

(87) PCT Pub. No.: WO2008/059285
PCT Pub. Date: May 22, 2008

(65) Prior Publication Data
US 2010/0110956 A1    May 6, 2010

(30) Foreign Application Priority Data

Nov. 13, 2006  (GB) .................................. 0622454.7
Mar. 29, 2007  (GB) .................................. 0706120.3

(51) Int. Cl.
*H04H 20/71*    (2008.01)
*H04W 4/22*     (2009.01)
*H04W 76/00*    (2018.01)
*G08B 25/00*    (2006.01)
*G08B 25/10*    (2006.01)
*H04W 4/06*     (2009.01)
(Continued)

(52) U.S. Cl.
CPC ............ *H04W 4/22* (2013.01); *G08B 25/003* (2013.01); *G08B 25/007* (2013.01); *G08B 25/10* (2013.01); *H04W 76/007* (2013.01); *H04W 4/06* (2013.01); *H04W 68/00* (2013.01); *H04W 88/06* (2013.01)

(58) Field of Classification Search
CPC ....................................................... H04W 4/22
USPC ......................................................... 370/312
See application file for complete search history.

(56) References Cited

U.S. PATENT DOCUMENTS 8,548,419 B1 * 10/2013 Sennett et al. ............. 455/404.1
2003/0207670 A1 * 11/2003 Fernandez et al. .......... 455/12.1
(Continued)

FOREIGN PATENT DOCUMENTS

EP     1 655 894 A1    5/2006
JP     2002-185389     6/2002
(Continued)

OTHER PUBLICATIONS

International Search Report for Application No. PCT/GB2007/050683; dated Feb. 20, 2008.
(Continued)

*Primary Examiner* — Shukri A Taha
*Assistant Examiner* — Farhad Ali
(74) *Attorney, Agent, or Firm* — Beusse Wolter Sanks & Maire

(57) ABSTRACT

A wireless area network terminal receives an unsolicited broadcast from a network to all wireless area network terminals in a predetermined category. The unsolicited broadcast includes an indicator that an emergency alert is waiting. The indicator triggers a request to be sent from the terminal to the network to allow the alert to be downloaded to the terminal.

38 Claims, 3 Drawing Sheets

(51) Int. Cl.
*H04W 68/00* (2009.01)
*H04W 88/06* (2009.01)

(56) References Cited

U.S. PATENT DOCUMENTS

| | | |
|---|---|---|
| 2003/0227540 A1 | 12/2003 | Monroe |
| 2004/0152493 A1* | 8/2004 | Phillips ................ G08B 27/005 |
| | | 455/567 |
| 2004/0180683 A1 | 9/2004 | Dennis et al. |
| 2005/0037728 A1 | 2/2005 | Binzel et al. |
| 2006/0030290 A1 | 2/2006 | Rudolf et al. |
| 2006/0040639 A1* | 2/2006 | Karl et al. ................. 455/404.1 |
| 2007/0008925 A1* | 1/2007 | Dravida et al. ................ 370/331 |
| 2007/0207771 A1* | 9/2007 | Bowser et al. ............ 455/404.1 |
| 2007/0220573 A1* | 9/2007 | Chiussi et al. ................. 725/114 |
| 2008/0085695 A1* | 4/2008 | Vare et al. ................. 455/404.1 |

FOREIGN PATENT DOCUMENTS

| | | |
|---|---|---|
| JP | 2005-242438 | 9/2005 |
| JP | 2006-66629 | 3/2006 |
| JP | 09-247720 | 9/2007 |
| WO | 2005/067492 | 7/2005 |
| WO | 2005/093998 | 10/2005 |
| WO | 2006/066629 A1 | 6/2006 |

OTHER PUBLICATIONS

United Kingdom Search Report for Application No. GB0706120.3; dated Jul. 16, 2007.

* cited by examiner

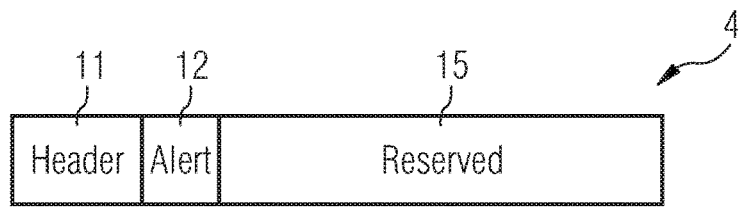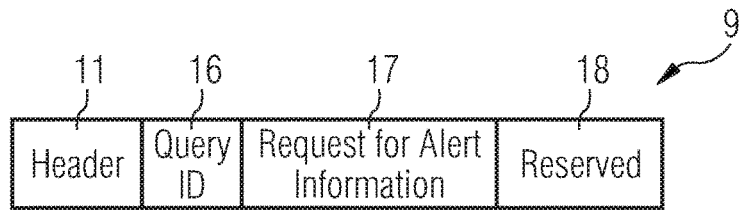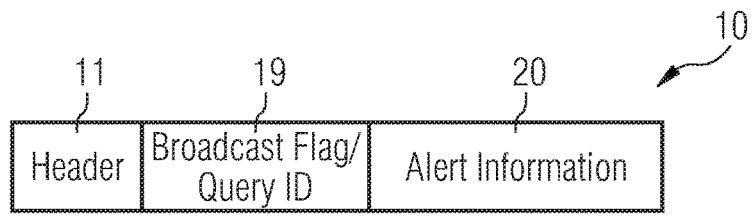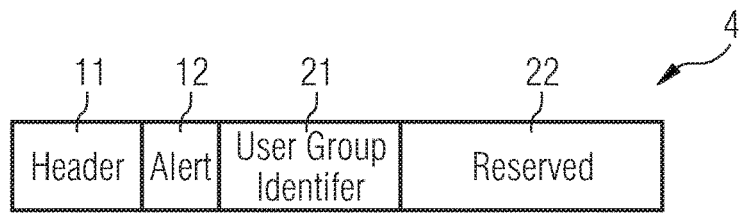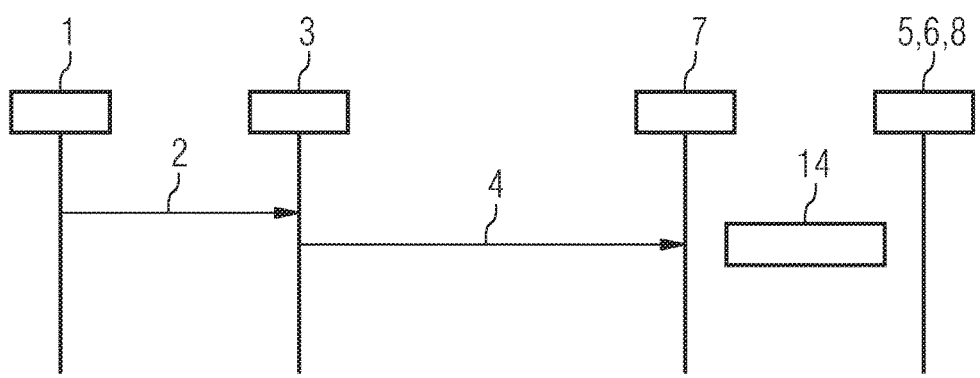

| Element ID | Length | Paging Group ID | Paging Interval | DPIM Count | Network Emergency Alert |
|---|---|---|---|---|---|
| 24 | 25 | 26 | 27 | 28 | 29 |

| B0 | B1 | B2 | B3 | B4 to B15 |
|---|---|---|---|---|
| QoS Map | Expedited Bandwidth Request | Emergency Service Only | Network Emergency Alert | Reserved |

EMERGENCY ALERT

CROSS REFERENCE TO RELATED APPLICATIONS

This application is a U.S. national stage of International Application No. PCT/GB2007/050683, filed Nov. 12, 2007 and claims the benefit thereof. The International Application claims the benefits of United Kingdom Application No. 0622454.7 filed on Nov. 13, 2006 and United Kingdom Application No. 0706120.3 filed on Mar. 29, 2007, all three applications are incorporated by reference herein in their entirety.

BACKGROUND

Described below is a method of providing an emergency alert to a wireless local area network terminal, in particular for the IEEE 802 family of wireless communications systems.

In the event of an emergency situation arising, various regional entities wish to notify users using any available communications systems at their disposal. It is likely that legislation will mandate this requirement for any wireless communication system, regardless of the application used, such as voice over internet protocol (VoIP), Text, Video, FAX, Email and Instant Messenger (IM). The wireless technology underpinning the communications media is not of concern to the entities mentioned above.

The IEEE 802 family of wireless communications systems, typically characterized by IEEE 802.11, are architecturally based on short range wireless communications and include, in order of increasing radio range coverage, IEEE 802.15 (Personal Area Networks), IEEE 802.11 (Local Area Networks), IEEE 802.16 (Wireless Metropolitan Area Networks, also referred to as WiMAX) and IEEE 802.22 (Wireless Regional Area Networks). Furthermore, there are other non-802 type networks to which the method applies, such as high performance radio wireless local area network (HIPERLAN) or high performance metropolitan area network (HIPERMAN) and reference to a wireless area network includes any of these.

SUMMARY

In accordance with a first aspect, a method of providing an emergency alert to a wireless area network terminal includes sending an unsolicited broadcast from a network to all wireless area network terminals in a predetermined category; wherein the unsolicited broadcast includes an indicator that an emergency alert is waiting; and wherein the indicator triggers a request to be sent from the terminal to the network to allow the alert to be downloaded to the terminal.

In wireless area networks of any of the types or categories mentioned above, the passive network edge elements have to signal to a user in a potentially unsolicited manner, whereas in a cellular system an allocated user channel would just be interrupted by an emergency alert message. According to the method, the wireless terminal can transmit a separate request back to the network in a two stage handshake process, allowing the alert to be transmitted.

The trigger may be an alert to the user, requesting that they initiate a connection to the network.

The request is then sent to the network on the connection that has been initiated.

Alternatively, the trigger initiates a connection to the network from the terminal automatically, in response to receipt of the unsolicited broadcast containing the indicator.

The indicator may be transmitted from a network with which the terminal is operating, but alternatively, the indicator is transmitted from a neighboring network within radio range of the terminal.

The predetermined category may be one of terminal type, or geographical range, or membership of a closed user group.

The indicator may be an additional field in a broadcast, multicast, or unicast transmission.

Alternatively, the indicator is an additional field in a paging message.

Typically, the wireless local area network is an IEEE 802 type network, although the method is equally applicable to other types of wireless local area network, such as high performance radio wireless local area network (HIPERLAN) or high performance metropolitan area network (HIPERMAN).

BRIEF DESCRIPTION OF THE DRAWINGS

These and other aspects and advantages a method of providing an emergency alert to a wireless local area network terminal will become more apparent and more readily appreciated from the following description of the exemplary embodiments, taken in conjunction with the accompanying drawings of which:

FIG. 3 is an example of an emergency alert message frame sent by the network in the method;

FIG. 4 is an example of a request message sent by a user device in the method;

FIG. 5 is an example of a response message sent by a user device in the method, in reply to the message of FIG. 2;

FIG. 6 is an example of an emergency alert message frame, for a closed user group;

FIG. 7 is an example of a message flow sequence in the scenario of FIG. 1, for a wireless device, which is aware of the emergency alert;

DETAILED DESCRIPTION OF THE PREFERRED EMBODIMENT

Figure 1:
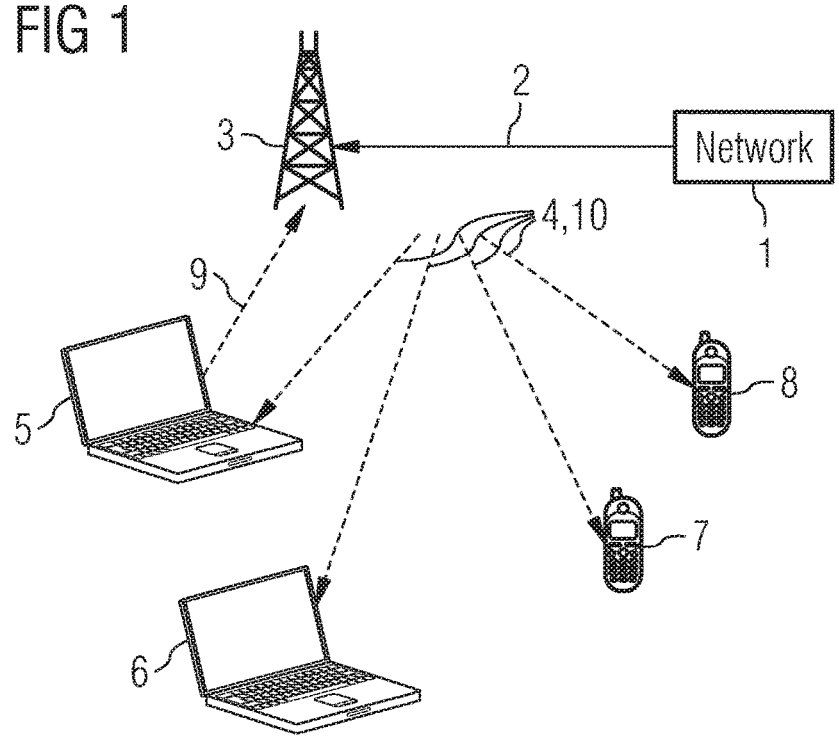
FIG. 1 is an iconic drawing of a typical deployment scenario in which the method may be applied.

Reference will now be made in detail to the preferred embodiments, examples of which are illustrated in the accompanying drawings, wherein like reference numerals refer to like elements throughout.

A problem for wireless area network communication systems wishing to provide an emergency alert is that passive network edge elements, such as an IEEE 802.11 access point, have to signal to the user in a potentially unsolicited manner, which goes against the normal mode of operation in these types of systems. If a user has established a data session, then the network can interrupt this session, but if a user does not have a data session in operation, the network edge element (e.g. an IEEE 802.11 access point) may not have any knowledge of the user's existence within a hotspot.

Even with an established data session, the alert may be of a different form (e.g. text message), to that of the current user session (e.g. a VoIP call). Since the IEEE 802 family of systems use packet based connections, the emergency alert message is able to share any currently allocated radio resources. In other words a dedicated channel for emergency alert transmission is not required. A further feature is to allow simultaneous transmission of the alert within the current user session (e.g. the aforementioned VoIP call) with another form of transmission (e.g. text message or ringing alert).

Where there is no established data session, the network needs to prompt the user to request receipt of the emergency alert. A prompting mechanism is suggested as this saves valuable radio resource, as it is expected that a cascade of messages will shortly follow, requesting more information. If the emergency alert were to be broadcast in an unsolicited manner, this may consume all available radio resources within that area. Upon reception of a centralized emergency alert notification (e.g. from a network entity), the network edge element (e.g. IEEE 802.11 access point) then broadcasts a signalling frame (e.g. an IEEE 802.11 beacon) with a special flag set to indicate that an emergency alert is ready to be delivered. This message typically uses a broadcast type address, but a multicast, or unicast message could be used instead.

The user device then initiates an algorithm to enable reception of this alert. The reception of the alert within the user device may trigger a prompt to the user, which can be of any type, such as a ring tone, video display wakeup, or vibration etc., to notify the user to react. Alternatively, the flag may cause the user device to set up a connection automatically.

FIG. 1 illustrates a typical deployment scenario for implementation of this method. The examples are described with respect to IEEE 802 type networks, but are equally applicable to other wireless personal, local, metropolitan, or regional area networks and references to wireless local area network (WLAN) in this description encompasses all such wireless area networks. A network 1 sends an emergency alert 2 to a network edge device 3, which relays this as an initial hotspot alert message 4. This alert is received at a number of wireless devices in the vicinity, including non-IEEE 802 wireless devices within radio reception range.

In the example of FIG. 1 the emergency alert message 2, relayed as a hotspot alert message 4, sent from the network 1 via the edge device 3, is broadcast to all devices 5, 6, 7, 8 within radio reception range. Of the devices within range, three are wireless enabled devices 5, 6, 7 and one is a cellular device 8. As the edge device 3 is sending communication for a specific type of wireless system, the cellular only device 8 does not respond to the broadcast. The wireless enabled device 7 is a multimode device including a cellular receiver, together with an IEEE 802 wireless receiver, so the device can receive the IEEE 802 wireless emergency alerts and be prompted to respond. The wireless device 5 has not been in recent communication with network edge device 3, so that it is not registered with this edge device; and the wireless device 6 is already connected to the network edge device 3 and is currently communicating with some other traffic, so that the device is currently registered with the network edge device. On receipt of the hotspot alert message frame with an emergency alert flag 12, the user device 6 connects to receive the alert 13 without requesting any further information from the network 1.

Figure 2:
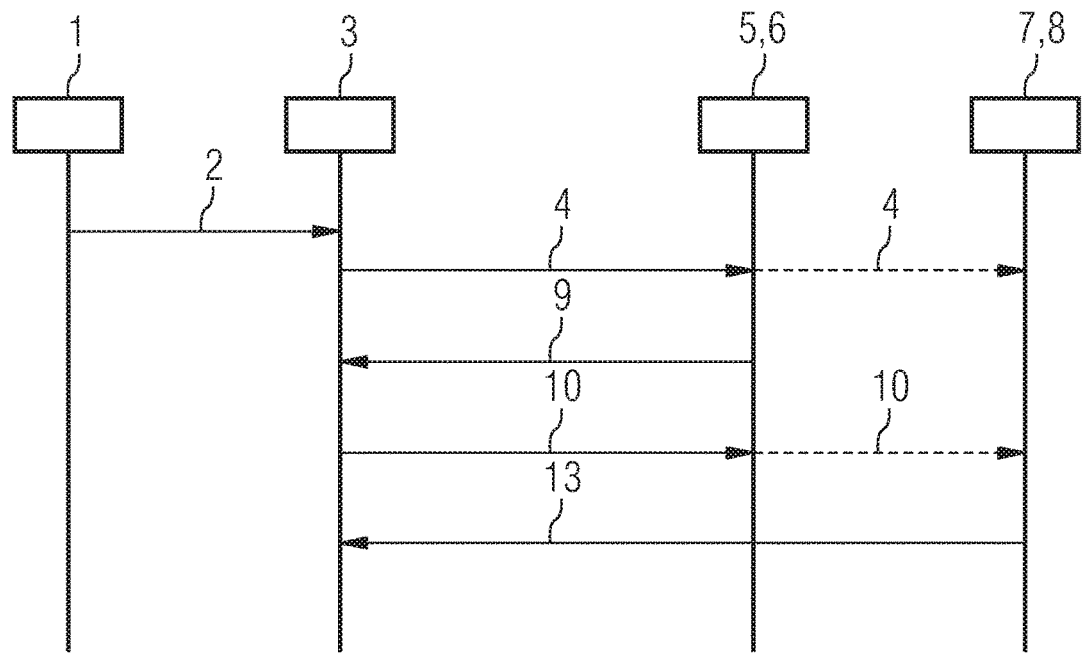
FIG. 2 is a message flow sequence diagram illustrating an example of the method applied in the scenario of FIG. 1, for certain wireless user devices.

The alert can be set to prompt a response from all devices within radio reception range that are the correct type of WLAN devices, or else user specific criteria are applied, as described below. Furthermore, in some circumstances an initial alert triggers the user device into requesting more information, either manually, or autonomously. The message flow sequence is as shown in FIG. 2. The network 1 sends the emergency alert 2 to the network edge device 3. The network edge device 3 sends a hotspot alert message 4 to all devices within radio range. Wireless devices 5, 6 may choose to send back a request message 9 to the network edge device 3 for further information and they receive a response 10, which is broadcast to all devices 5, 6, 7, 8 within radio range.

The emergency alert message 2 may be a single field 12 within the hotspot alert message 4 as shown in FIG. 3, to indicate that an alert is present within the network. The hotspot alert message 4 is typically made up of several fields and includes a header 11, the alert field 12, and the remainder of the bits in the message 4 are a reserved field 15. In FIG. 4, an example of a request frame message 9 transmitted to the network is shown. The request 9 includes a header 11, query identifier 16, request for alert information 17 and a reserved field 18. The request, once received by the network edge device, then enables the user device to be provided with more information, if available, through a response 10 to the network edge device. An example of a response message 10 is shown in FIG. 5, in which a header 11, broadcast flag, or query identifier 19 and alert information 20 are provided. The network edge device returns the further information, if any is available, in the response. The response from the network edge device 3, is transmitted in a broadcast fashion, so that any other terminals 6, 7, 8 in radio range can receive the same information. Alternatively, multicast, or unicast transmission can be used to limit the number of user devices which are allowed to receive the transmission.

As a minimum, receipt of the emergency alert field prompts the receiving device to connect to receive the emergency alert information content, either through user action, or an automated sequence. However, in order to adapt the broadcast to a specific user group, some of the reserved field can be allocated as identifiers for the user group (as shown in FIG. 6, where a user group identifier 21 is provided and the remaining bits are a reserved field 22), rather than simply relying on all users within radio reception range responding. An indication of the emergency alert is transmitted in this way, to save radio resource bandwidth. In the scenario of FIG. 1, the user device 7 is already connected and working, so on receipt of the broadcast hotspot alert message frame 4 with the emergency alert flag 12, the user device 7 determines from the user group identifier field 21 that the user device is not within the specified user group and continues its normal working. If the device did fall within the required user group, the device could simply divert resources to request receipt of the alert.

FIG. 7 illustrates a typical message exchange with user device 7 in the scenario of FIG. 1. Initially the network 1 issues an emergency alert message 2, which is then relayed in a hotspot alert 4 from the network edge device 3. In this scenario, the indication may be ignored 14 by the multi-mode device 7 on the basis that a similar alert has already been received on the cellular receiver within the multi-mode device, from a suitable cellular transmitter. If an indication has not been received on the cellular receiver, then the multi-mode device 7 can process the alert 2 in a similar manner to wireless devices 5, 6, as described with respect to FIG. 2, depending on whether, or not the multi-mode device 7 is transmitting data over the IEEE 802 wireless interface at the time.

A further option is to allow simultaneous transmission of the alert on the current user session, rather than requiring an interruption. The user may then perceive the alert as a pop up window in a current media session, or alternatively a text message, email or ringing alert The Query ID field 16, 19 in the request and response messages 9, 10 is a token generated by the wireless device 5, which allows the network edge device 3 to respond to this device directly, if there is a requirement to do so. The response message 10 may be sent in a unicast mode to the specific device 5 which requested the alert information using the Query ID value, or the response may be transmitted in a broadcast mode to all IEEE 802 wireless devices 5, 6, 7 or in a multicast mode, to a specific subset of IEEE 802 wireless devices, 5, 6 defined by the Query ID value.

Figures 8, 9, 10:
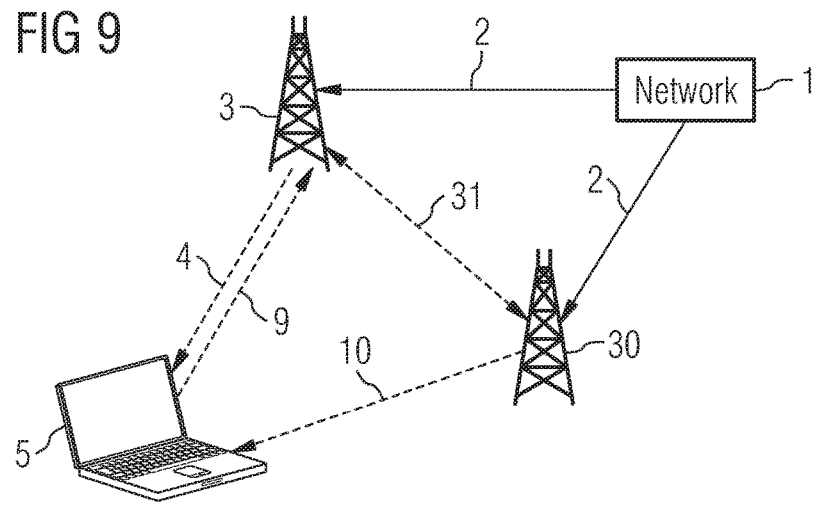
FIG. 8 is a paging emergency alert message frame.
FIG. 9 is an alternative scenario to that shown in FIG. 1.
FIG. 10 is an implementation specific example of an emergency alert message frame for IEEE 802.11.

Within an IEEE 802 system which uses paging to awaken an idle wireless device, operation is very similar to the above method, with the distinction that the alert notification of FIG. 3 is appended to a paging update, so that when the wireless device awakens for the paging update, it then can respond to the alert notification. It is known to have paging updates extend the IEEE 802.11 beacon with a paging group indicator field. User devices which wish to enter an idle mode, add themselves to the current paging group in operation within the local hotspot. The user device then powers down its IEEE 802.11 radio receiver, which has been synchronized previously with the paging beacons from the IEEE 802.11 access point. This then means that the user device only has to awaken for each paging beacon to remain in contact with the network. This paging group indicator field may be further extended as shown in FIG. 8 to include the network emergency alert field. The paging update 23 includes an element identifier 24, a length field 25, a paging group identifier 26, a paging interval field 27, digital pulse interval modulation (DPIM) count field 28 and network emergency alert 29. The advantage of this mechanism is that IEEE 802.11 devices in idle mode, would wake upon reception of this modified paging message and then proceed to request the emergency alert information as described above.

As mentioned above, a further extension to the method is that under certain circumstances, the emergency alert system is restricted to a closed user group. This may occur, for example, when wishing to restrict an emergency alert to a limited geographical area, e.g. in the event of a chemical spillage; or when wishing to restrict the emergency alert to specific user types, such as police or army, for security reasons (e.g. to avoid civilian panic). This restriction is applied as shown in FIG. 6, where the header 11 and alert field 12 are augmented by the user group identifier 21 and the remaining fields 22 are reserved. The initial hotspot alert message 4, as shown in FIG. 3, is modified by the addition of the user group identifier 21. Although the network edge device 3 transmits this message as an emergency alert, only IEEE 802 wireless devices recognizing the user group identifier will respond to the message. Security of these messages is achieved through known methods such as Diffie-Hellman key exchange; use of well known session keys; or through the use of certificates within the user group devices.

In a further example, as shown in FIG. 9, the IEEE 802 wireless device 5 issues the request 9 for more information to the initial hotspot transmitter 3, but there is nothing to stop another network edge device 30 from transmitting the response 10. This may be a useful feature, if the device 5 is in motion, particularly within a moving vehicle where emergency alerts may be highly desirable. Network signalling 31 takes place between the two network edge devices 3, 30 which relays the query ID 16 and request for alert information 17 from device 5, in a similar format to that of the request 9.

FIG. 10 illustrates a specific implementation for IEEE 802.11. Within an IEEE 802.11 system (Wireless Local Area Network), one example of the implementation details of the hotspot alert is as follows. Bit 0 (B0) provides a quality of service (QoS) map, bit 1 (B1) is for an expected bandwidth request, bit 2 (B2) is reserved for emergency service only, bit 3 (B3) of the interworking capabilities field is used for the network emergency alert notification (the interworking capabilities field is typically transmitted within an IEEE 802.11 beacon frame), and bits 4 to 15 (B4 to B15) are reserved. Upon receipt of this alert, an IEEE 802.11 terminal can then issue a probe request message conforming to the format as shown above in FIG. 4 for further information.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method of providing an emergency alert to a terminal of a wireless area network, the network comprising an IEEE 802 type network, high performance radio wireless local area network, or high performance metropolitan area network, communicating with all wireless enabled terminals using an Internet Protocol, the method comprising:
   sending an initial signaling frame for an unsolicited broadcast message from a network edge device of the wireless area network to wireless enabled terminals, the unsolicited broadcast message being only a trigger including an indicator flag, in a respective one field of the signaling frame, being indicative that an emergency alert is waiting;
   receiving at least the indicator flag in the signaling frame at a wireless enabled terminal; and
   sending, on a radio resource, a request message frame by the wireless enabled terminal to the wireless area network for the emergency alert to be downloaded to the wireless enabled terminal, said received indicator flag at the terminal acting as the trigger for the request message frame to be sent from the wireless enabled terminal to the wireless area network.

2. A method according to claim 1,
   wherein the received indicator flag triggers a prompt to at least one user, requesting that the at least one user initiate a connection to the network.

3. A method according to claim 1, further comprising:
initiating a connection from the terminal to the network automatically, in response to receipt of the initial signaling frame of the unsolicited broadcast message containing the indicator flag.

4. A method according to claim 1,
wherein the unsolicited broadcast message is appended to a paging beacon signal and the terminal is in radio range with the network edge device; wherein the terminal adds the terminal to a paging group in operation with the network edge device, then powers down and awakens in response to receipt of the paging beacon signal to receive the unsolicited broadcast message.

5. A method according to claim 1,
wherein the initial signaling frame of the unsolicited broadcast message is configured as a hotspot message frame; and the terminal is in radio range and unregistered with the network edge device.

6. A method according to claim 1,
wherein the initial signaling frame of the unsolicited broadcast message is configured as a hotspot message frame and the terminal is a wireless multimode device in radio range with the network edge device; the terminal configured to communicate according to a first communication mode and a second communication mode; and the network edge device communicates the hotspot message frame using the first communication mode.

7. A method according to claim 1,
wherein the wireless enabled terminals are in a predetermined category being one of terminal type, geographical range, and membership in a closed user group.

8. A method according to claim 1,
wherein the respective one field for the indicator flag is an additional field in a broadcast, multicast or unicast transmission with message information field bits reserved.

9. A method according to claim 1,
wherein the respective one field for the indicator flag is an additional field in a paging message.

10. A method according to claim 1,
wherein the terminal is programmed to be responsive to the trigger of the indicator flag.

11. A method according to claim 10,
wherein the indicator flag triggers the terminal to generate prompt to at least one user, requesting that the at least one user initiate a connection to the network.

12. A method according to claim 10, further comprising:
initiating a connection from the terminal to the network automatically in response to receipt of the unsolicited broadcast message containing the indicator flag wherein message information field bits of the signaling frame being reserved.

13. A method according to claim 1, further comprising:
transmitting a message containing the emergency alert to the terminal via the wireless area network in response to the request message frame by the terminal.

14. A method according to claim 13,
wherein the request message frame contains a token generated by the terminal, which enables the network edge device to respond directly to the terminal.

15. A method according to claim 14,
wherein said transmitting of the emergency alert to the terminal uses a multicast transmission also responding to request message frames from other terminals.

16. A method according to claim 14,
wherein said transmitting of the emergency alert to the terminal uses a unicast transmission.

17. A method according to claim 1,
wherein the wireless enabled terminals include a predetermined category of a specified user group.

18. A method according to claim 17,
wherein the specified user group has a common user type.

19. A method according to claim 1, further comprising:
ignoring the indicator flag by any of the terminals that received the unsolicited broadcast message and which previously received the emergency alert via another communication network.

20. A wireless communication system comprising:
a wireless area network communicating with all terminals using an Internet Protocol, said wireless area network being an IEEE 802 type network, high performance radio wireless local area network, or high performance metropolitan area network;
a wireless area network entity, connected to the wireless area network, sending an emergency alert;
a network edge device, connected to the wireless area network, sending an initial signaling frame of an unsolicited broadcast message to wireless enabled terminals, the unsolicited broadcast message being only a trigger including an indicator flag, in a respective one field of the signaling frame, being indicative that an emergency alert is waiting; and
at least one of the wireless enabled terminals sending, on a radio resource, a request message frame to said network edge device for the emergency alert information to be downloaded to said terminal, the indicator flag, received by the wireless enabled terminal, acting as the trigger for the request message frame to be sent from the wireless enabled terminal to the wireless area network.

21. A system according to claim 20,
wherein the indicator flag triggers a prompt to a user, requesting that the user initiate a connection to the network.

22. A system according to claim 20,
wherein the wireless enabled terminal transmits a request to the network edge device for further information.

23. A system according to claim 20,
wherein the trigger initiates a connection to transmit the request message frame from said wireless enabled terminal to the network automatically, in response to receipt of the unsolicited broadcast message containing the indicator flag.

24. A system according to claim 23,
wherein the respective one field with the indicator flag is an additional field in a broadcast, multicast or unicast transmission with message information field bits reserved; or an additional field in a paging message.

25. A system according to claim 20,
wherein the indicator flag is an additional field in a broadcast, multicast or unicast transmission with message information field bits reserved; or an additional field in a paging message.

26. A system according to claim 20,
wherein the indicator flag indicating an emergency alert is ready to be delivered is a special flag.

27. A system according to claim 26,
wherein the terminal programmed to be responsive to the trigger of the indicator flag triggers a prompt to a user, requesting that the user initiate a connection to the network.

28. A system according to claim 26,
wherein the trigger initiates a connection from said terminal to the network automatically, in response to receipt of the unsolicited broadcast message containing the indicator flag wherein message information field bits of the signaling frame being reserved.

29. A system according to claim 20, wherein
a message containing the emergency alert is transmitted to the terminal via the wireless area network in response to the request message frame from the terminal.

30. A system according to claim 29,
wherein the request message frame contains a token generated by the terminal, which enables the network edge device to respond directly to the terminal.

31. A system according to claim 30,
wherein the waiting emergency alert transmitted to the terminal uses a multicast transmission also responding to requests from other terminals.

32. A system according to claim 30,
wherein the waiting emergency alert transmitted to the terminal uses a unicast transmission.

33. A system according to claim 20,
wherein the wireless enabled terminals are in a predetermined category being a specified user group.

34. A system according to claim 33,
wherein the specified user group has a common user type.

35. A system according to claim 20, wherein
the indicator flag being ignored in any of the terminals that received the unsolicited broadcast message and which previously received the emergency alert via another communication network.

36. A network edge device for providing an emergency alert to a terminal of a wireless area network which is part of a wireless communication system, the wireless area network communicating with terminals using an Internet Protocol and being an IEEE 802 type network, a high performance radio wireless local area network, or a high performance metropolitan area network, said network edge device being part of the wireless communication system and constructed to:

send an initial signaling frame of an unsolicited broadcast message to all in-range terminals, said unsolicited broadcast message being only a trigger including an indicator flag, in a respective one field of the signaling frame, being indicative that an emergency alert is waiting; and receive a request message frame sent by the terminal to the wireless area network for the emergency alert to be downloaded to the terminal, said indicator flag being received at the terminal acting as the trigger for the request message frame to be sent from the terminal to the wireless area network.

37. The network edge device of claim 36,
further constructed to transmit, in response to receiving the request message frame from the terminal, the emergency alert to be downloaded to the terminal.

38. A terminal of a wireless area network which is part of a wireless communication system, the wireless area network communicating with the terminal using an Internet Protocol and being an IEEE 802 type network, high performance radio wireless local area network, or high performance metropolitan area network, said terminal being part of the wireless communication system and constructed to:

receive an initial signaling frame having unsolicited broadcast message sent by a network edge device of the wireless area network to terminals, said unsolicited broadcast message being only a trigger including an indicator flag, in a respective one field of the signaling frame, indicative that an emergency alert is waiting;

receive at least the indicator flag at the terminal; and send, on a radio resource, a request by the terminal to the wireless area network for the emergency alert to be downloaded to the terminal, said received indicator flag at the terminal thereby acting as the trigger for the request to be sent from the terminal to the wireless area network.

* * * * *